United States Patent [19]

Conterno et al.

[11] Patent Number: 5,586,258
[45] Date of Patent: Dec. 17, 1996

[54] MULTILEVEL HIERARCHICAL MULTIPROCESSOR COMPUTER SYSTEM

[75] Inventors: Bruno Conterno, Genova-Rivarolo; Mauro Gismondi, Genoa; Vildo Luperini; Fernando Pesce, both of Genova-Sestri, all of Italy

[73] Assignee: Finmeccanica S.p.A., Italy

[21] Appl. No.: 258,759

[22] Filed: Jun. 13, 1994

[30]  Foreign Application Priority Data

Jun. 11, 1993 [IT] Italy .................................. TO93A0428

[51] Int. Cl.⁶ ........................... G06F 15/17; G06F 15/16; G06F 13/36
[52] U.S. Cl. ................................ 395/200.01; 395/200.03; 395/449; 364/DIG. 1; 364/DIG. 2
[58] Field of Search ...................................... 395/200, 500, 395/325, 375, 800, 250, 275, 775, 725, 575, 285, 445, 293, 307, 200.03, 200.01, 449, 446, 416, 465; 364/DIG. 1, DIG. 2, 478; 371/48, 10.1, 49.1; 370/61; 340/825.52

[56] References Cited

U.S. PATENT DOCUMENTS

| | | | |
|---|---|---|---|
| 4,130,865 | 12/1978 | Heart et al. | 395/200 |
| 4,485,438 | 11/1984 | Myrmo et al. | 395/325 |
| 4,564,900 | 1/1986 | Smitt | 392/325 |
| 4,734,865 | 3/1988 | Scullion et al. | 364/478 |
| 4,942,575 | 7/1990 | Earnshaw et al. | 371/10.1 |
| 5,420,992 | 5/1995 | Killiam et al. | 395/375 |

Primary Examiner—Daniel H. Pan
Attorney, Agent, or Firm—Palmatier, Sjoquist & Helget, PA

[57] ABSTRACT

A multilevel multiprocessor system comprising a number of processing units, each comprising a number of multiprocessor modules connected to a first direct-access line to form a first hierarchical level (region); the processing units comprising subsets of multiprocessor modules connected to respective second direct-access lines to form a second hierarchical level (family); and each multiprocessor module comprising a number of processing modules connected to a direct-access (group) line connected to the first and second lines.

33 Claims, 6 Drawing Sheets

MULTILEVEL HIERARCHICAL MULTIPROCESSOR COMPUTER SYSTEM

BACKGROUND OF THE INVENTION

The present invention relates to a multiprocessor system.

Multiprocessor systems are known comprising a number of elementary processing units (modules) connected to one another by data exchange lines (BUSES) according to a multilevel architecture.

European Patent EP-226.096 filed by ELETTRONICA SAN-GIORGIO ELSAG S.p.A., for example, describes a multiprocessor system comprising a first number of elementary processing modules connected to a first common direct-access line to form a first (family) level; and at least one module in the first number of modules is connected to a second common direct-access line to form a second (region) level.

The second lines are also connected to one another by third data exchange lines to form a third (region network) level.

Internally, each module comprises a processor connected to a fourth data exchange line defining a fourth (private) level and communicating with a fifth data exchange line defining a fifth (local) level.

SUMMARY OF THE INVENTION

It is an object of the present invention to provide a perfected system of the aforementioned type.

According to the present invention, there is provided a multilevel multiprocessor system, characterized in that it comprises:

- at least one processing unit comprising a number of multiprocessor modules PN connected to a direct-access line to form a region level;
- said number of multiprocessor modules PN also being subdivided into at least two subgroups, each comprising respective numbers of multiprocessor modules PN directly connected to a respective direct-access line to form a family level;
- each multiprocessor module comprising a number of active processing modules PE connected to a common direct-access line to form a group level; and
- said group line also communicating with said region line and said family line.

BRIEF DESCRIPTION OF THE DRAWINGS

A preferred embodiment of the present invention will be described with reference to the accompanying drawings, in which.

DETAILED DESCRIPTION OF THE INVENTION

Figure 1:
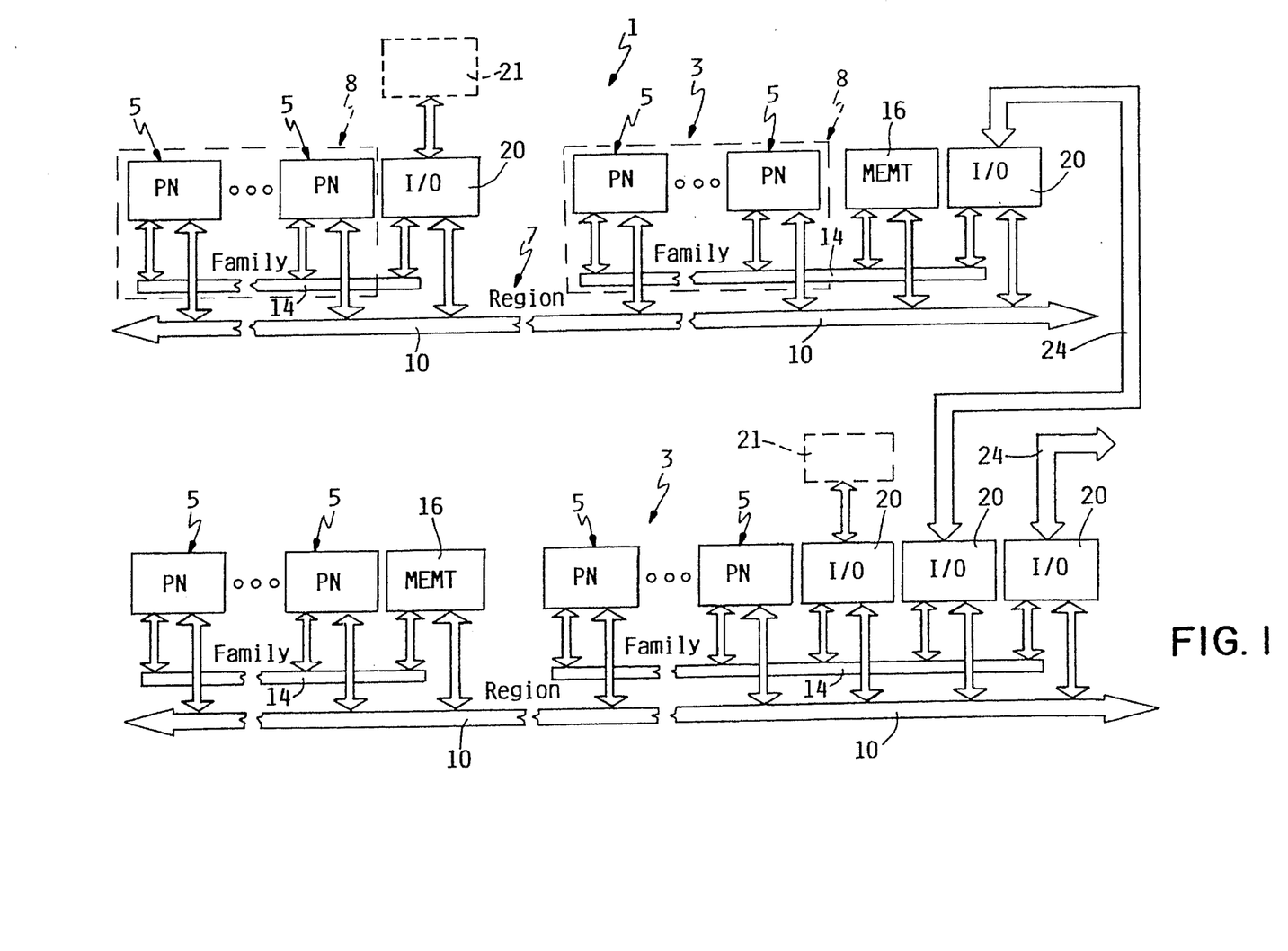
FIG. 1 shows a block diagram of a multiprocessor system in accordance with the present invention.

Number 1 in FIG. 1 indicates a multiprocessor system wherein a number of processing units 3 are formed by a number of multiprocessor modules PN 5.

More specifically, each unit 3 is subdivided into a region 7 and a number of families 8 parallel to region 7.

Each region 7 consists of all the PN modules 5 of unit 3, and a common communication line (region bus) 10 connected to all the PN modules 5; while each family 8 consists of a subset of PN modules of unit 3, and a respective common communication line (family bus) 14 connecting the PN modules in each subset.

As such, each PN module is connected directly to region bus 10 and to a respective family bus 14, and therefore provides for linking region 7 and family 8.

Each region 7 may also comprise one (or more) high-capacity memory modules MEMT 16 connected to region bus 10 and a respective family bus 14.

Each unit 3 may also comprise one (or more) data exchange (INPUT/OUTPUT) modules 20 connected to region bus 10 and a family bus 14; and the data exchange modules 20 of various units 3 may be connected to one another by communication lines (interregional buses) 24 for permitting data exchange between various processing units 3. Data exchange modules 20 may also communicate with peripheral units 21 (shown schematically) such as disk readers, printers, plotters, etc.

Figure 2:
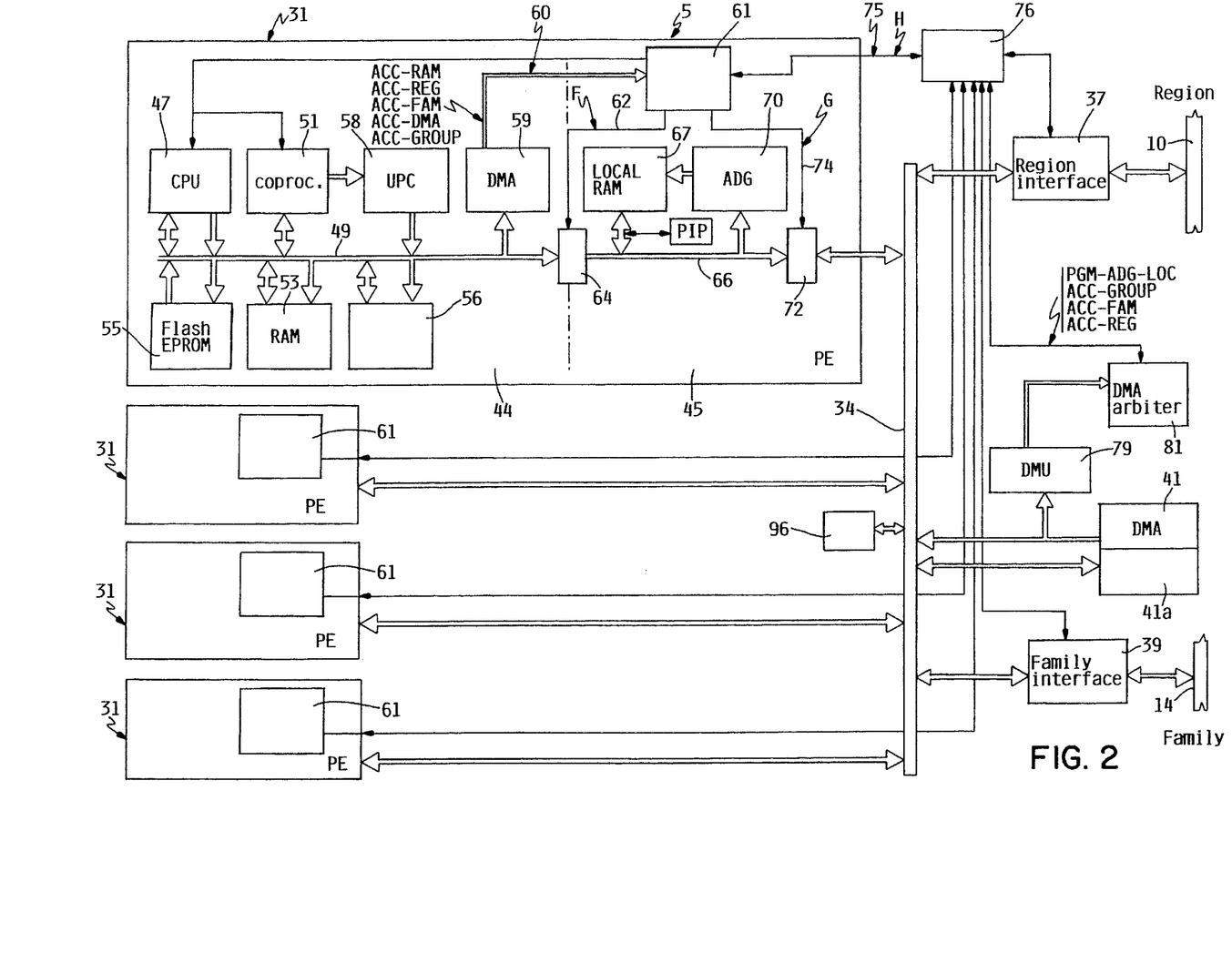
FIG. 2 shows a block diagram of a first module in the FIG. 1 system.

As shown in FIG. 2, each PN module 5 comprises four active modules PE (PROCESSING ELEMENT) 31 which are the elementary computing units of the architecture and identical to one another.

PE modules 31 are connected parallel by a common line (group bus) 34 extending between a region interface 37 connected to region bus 10, and a family interface 39 connected to the respective family bus 14 to which PN module 5 is connected.

Each PN module also comprises a direct memory access (DMA) control block 41 connected to group bus 34 and which provides for emitting a number of memory location addresses as of which data is transferred. Operation of block 41 will be described in more detail later on.

As shown in FIG. 2, each PE module 31 is subdivided into two blocks 44 and 45 constituting a so-called private level and a so-called local level.

Private block 44 comprises a processor (CPU) 47, and a common communication line (private bus) 49 connected to processor 47.

Processor 47 constitutes the central unit of PE module 31, and may consist of an X86-family INTEL microprocessor supplied with 32 address bits and 32 data bits.

Communication line 49 supports the data, addresses and control signals to and from processor 47.

Block 44 also comprises a coprocessor 51, e.g. a MOTOROLA DSP96002 or CYRIX 83D87, connected to private bus 49.

Coprocessor 51 provides for accelerating a number of operations which would be an "encumbrance" if performed solely by processor 47.

Coprocessor 51 may be a master/slave or slave only type. If a master/slave type, it is associated with a circuit (not shown) for converting the cycle performed by coprocessor 51 into the same cycle as processor 47, and so permitting access by coprocessor 51 to the various levels (region, family, group, local, private) of unit 3; and is associated with a coprocessor paging unit (UPC) block 58 connected to private bus 49 and communicating with coprocessor 51.

UPC block 58 translates the linear addresses emitted by coprocessor 51 into physical addresses according to the memory management mechanism of processor 47, to permit coprocessor 51 to access the entire memory of system 1 using the same mechanism as processor 47.

UPC block 58 is started up by processor 47 during startup of system 1 as a whole, so that it contains all the information relative to the memory structure of unit 3 of system 1.

UPC block 58 therefore provides for translating the addresses emitted by coprocessor 51, and for generating interrupts to processor 47 whenever coprocessor 51 attempts to access an address not described in UPC block 58.

If a slave only type, coprocessor 51 is not permitted access to system resources, and only contains the logics required for supporting operation of the system, in which case, UPC block 58 is absent, and processor 47 accesses coprocessor 51 as it would an input/output port.

Figure 5:
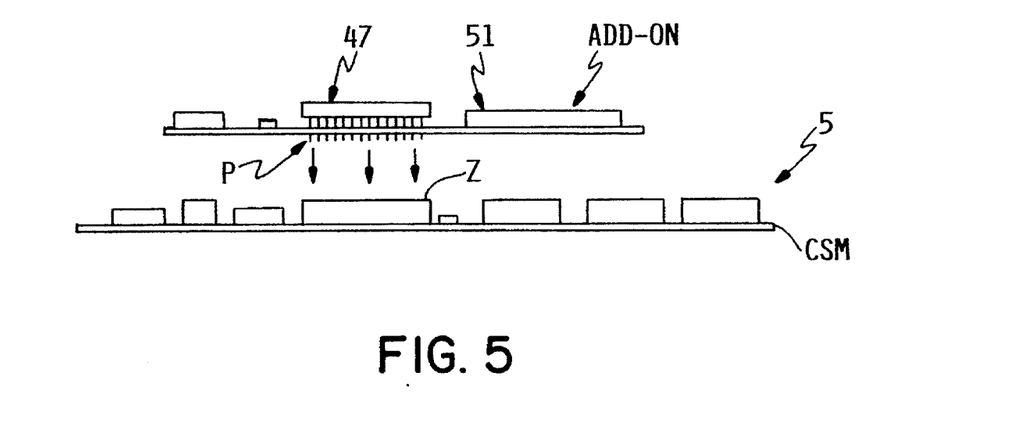
FIG. 5 shows a construction detail of the FIG. 1 system.

FIG. 5 shows the hardware structure for supporting and connecting coprocessor 51 to the other parts of the PN module. More specifically, each PN module 5 is formed on a rectangular CSM board (printed circuit) to which a number of electronic components are SMT welded (Surface Mounting Technique).

The CSM board also presents one (or more) sockets Z for connection to pins P extending from the bottom face of an add-on board and forming part of an integrated circuit forming processor 47.

The add-on board also supports the integrated circuit forming coprocessor 51, and the circuits forming UPC block 58.

Private bus 49 is also connected to a private RAM memory 53, and to an EPROM memory 55, more specifically a FLASH-EPROM memory, in which the operating system and startup and diagnostic programs are stored.

RAM memory 53 presents an extremely short access time permitting no-wait-cycle operation of processor 47.

Private block 44 comprises a peripheral unit 56 connected to private bus 49 and which provides for performing all the auxiliary control functions required by the PE module (e.g. timing, fault detection, etc.).

Private block 44 also comprises a general-purpose decoding (DMU) block 59 connected to private bus 49 and which provides for decoding the addresses emitted by processor 47 and/or coprocessor 51, and for generating access requests to the various levels of units 3.

As such, DMU block 59 contains information relative to the memory mapping of unit 3 as a whole.

DMU block 59 is also connected by line 60 to a local arbiter block 61 in turn connected by line 62 to an interface 64 for connecting/separating private bus 49 to/from a line (local bus) 66 forming part of local block 45 and supporting data, addresses and control signals.

Local block 45 comprises a local RAM memory 67 connected to local bus 66 and accessible by processor 47, group bus 34, and region and family buses 10, 14.

RAM 67 constitutes the local memory of PE module 31, is shared by the private level and group level, and is accessed rapidly to permit no-wait-cycle operation of processor block 47.

Local block 45 also comprises an address generating (ADG) block 70 connected to local bus 66 and cooperating with, and generating the addresses for, RAM memory 67.

Local bus 66 is also connected to an interface 72 which separates local block 45 from group bus 34 for exchanging data and control signals to and from group bus 34.

Interface 72 is connected by line 74 to local arbiter block 61.

Local arbiter block 61 is also connected by line 75 to a group arbiter block 76 connected to region interface 37 and family interface 39.

Depending on the signals on line 60, block 61 controls data transfer between the private, local, group, region and family levels.

Local arbiter block 61 provides for arbitrating the access requests from processor block 47 or coprocessor 51, from group, family and region buses 34, 14, 10, and from DMA controller 41.

More specifically, block 61 may receive from processor 47 over line 60:

an ACC-RAM signal for requesting access to a RAM memory 67 of another PE module 31 via group level;

an ACC-REG signal for requesting access to the region level;

an ACC-FAM signal for requesting access to the family level;

an ACC-GROUP signal for requesting access to the group level; and an ACC-DMA signal for requesting access to the registers of DMA controller 41.

Block 61 supplies along line 62 a signal F for connecting private bus 49 and local bus 66 via interface 64, and along line 74 a signal G for connecting local bus 66 and group bus 34 via interface 72.

Local arbiter block 61 receives and transmits along line 75 a signal H containing the access requests to and from the group level.

Group arbiter block 76 arbitrates use of group bus 34 by the four PE modules 31, of the region and family levels, and of controller 41.

Block 41 is connected to a general-purpose decoding (DMU) block 79 for decoding the addresses emitted by block 41, and for generating access requests to the various system levels. Block 79 contains information relative to mapping of the entire memory space of the system, and is started up at the startup phase.

Block 79 is also connected to a DMA ARBITER block 81 communicating with group arbiter block 76, and which provides for controlling access to and from block 41.

Via arbiter block 81, block 41 may access address generating block 70 for programming it.

More specifically, block 81 receives a number of signals from block 79:

a PGM-ADG-LOC signal for requesting access by DMA controller 41 to address generating block 70 via group level for programming block 70;

an ACC-GROUP signal for requesting access to the group level;

an ACC-FAM signal for requesting access to the family level; and an ACC-REG signal for requesting access to the region level.

More specifically, and as explained in more detail later on, the PGM-ADG-LOC signal provides for programming blocks 70 and identifying the memory locations as of which data is to be transferred in DMA mode.

Figure 3:
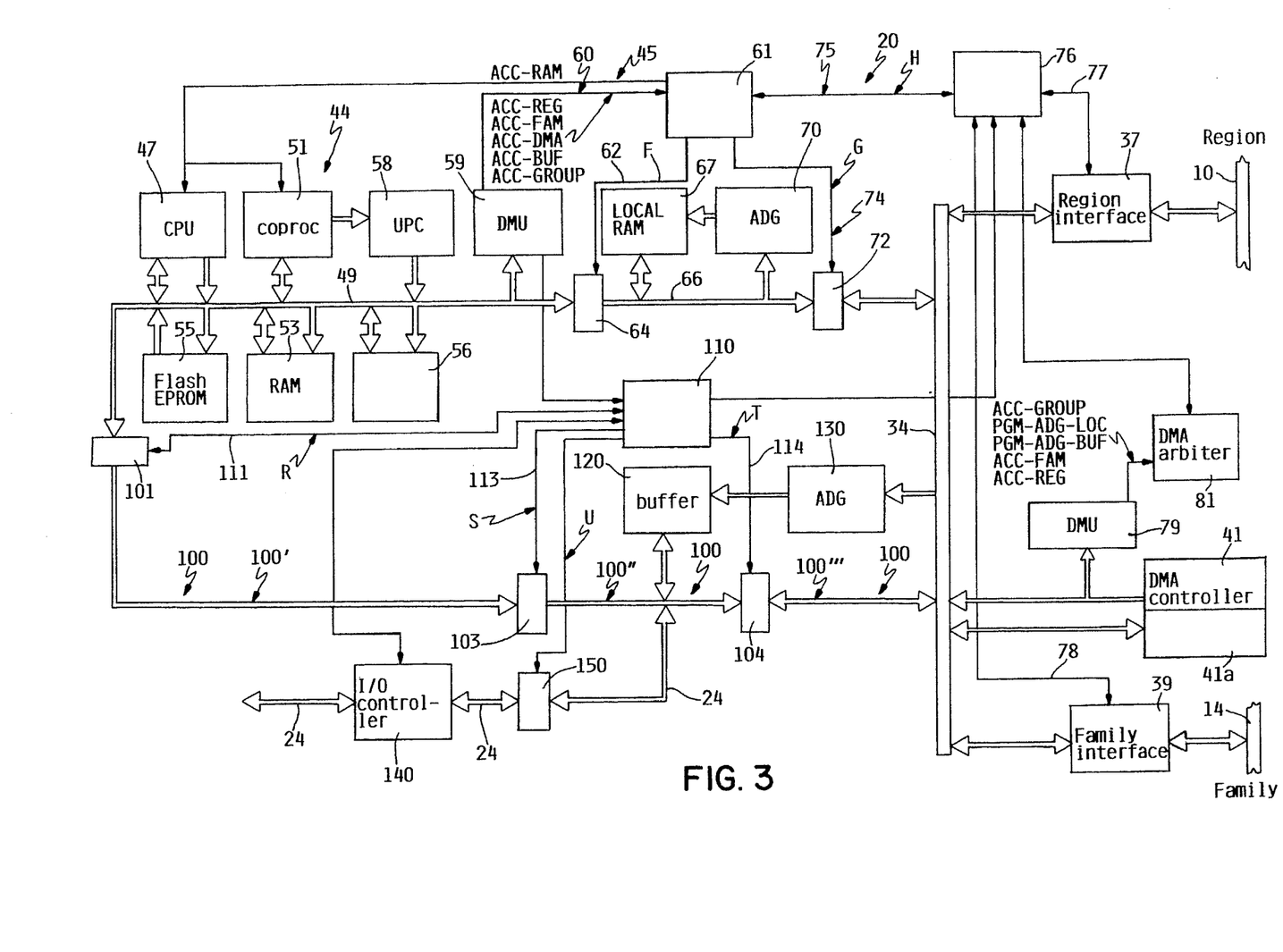
FIG. 3 shows a block diagram of a second module in the FIG. 1 system.

Data exchange module 20 will now be described in detail with reference to FIG. 3.

Module 20 is composed of a standard part, identical to PE module 31 already described, and a specific input/output part.

The standard part will be described using the same numbering system as for corresponding parts of PE module 31, whereas additional numbers will be used for the input/output part.

More specifically, module 20 is subdivided into two blocks 44 and 45 constituting a so-called private level and a so-called local level.

Private block 44 comprises a processor (CPU) 47, and a common communication line (private bus) 49 connected to processor 47.

Processor 47 may consist, for example, of an X86-family INTEL microprocessor supplied with 32 address bits and 32 data bits.

Communication line 49 supports the data, addresses and control signals to and from processor 47.

Block 44 also comprises a coprocessor 51, e.g. a MOTOROLA DSP96002 or CYRIX 83D87, connected to private bus 49.

Private bus 49 is also connected to a private RAM memory 53, and to an EPROM memory 55, more specifically a FLASH-EPROM memory, in which the operating system and startup and diagnostic programs are stored.

RAM memory 53 presents an extremely short access time permitting no-wait-cycle operation of processor 47.

Private block 44 comprises a peripheral unit 56 connected to private bus 49 and which provides for performing all the auxiliary control functions required by the PE module (e.g. timing, fault detection, etc.).

Private block 44 comprises a coprocessor paging unit (UPC) block 58 connected to private bus 49 and communicating with coprocessor 51.

Block 58 translates the linear addresses emitted by coprocessor 51 into physical addresses to permit coprocessor 51 to access the entire memory of system 1 using the same memory management structure as processor 47.

Private block 44 also comprises a general-purpose decoding (DMU) block 59 connected to private bus 49 and which provides for decoding the addresses emitted by processor 47 or coprocessor 51, and for generating access requests to the various levels of system 1.

As such, block 59 contains information relative to the memory mapping of the system as a whole.

Block 59 is also connected by line 60 to a local arbiter block 61 in turn connected by line 62 to an interface 64 for connecting/separating private bus 49 to/from a line (local bus) 66 forming part of local block 45 and supporting data, addresses and control signals.

Local block 45 comprises a local RAM memory 67 connected to local bus 66 and accessible by processor 47. RAM 67 constitutes the local memory of the PE module, is shared by the private level and group level, and is accessed rapidly to permit no-wait-cycle operation of processor block 47.

Local block 45 also comprises an address generating (ADG) block 70 connected to local bus 66 and cooperating with, and generating the addresses for, RAM memory 67.

Local bus 66 is also connected to an interface 72 driven via line 74 by local arbiter block 61, and which separates/connects local bus 66 from/to group bus 34 for exchanging data and control signals to and from group bus 34.

Arbiter block 61 is also connected by line 75 to a group arbiter block 76 connected by respective lines 77, 78 to region interface 37 and family interface 39.

Depending on the signals on line 60, block 61 controls data transfer between the private, local, group, region and family levels.

Local arbiter block 61 provides for arbitrating the access requests from processor block 47, coprocessor 51, or group bus 34.

More specifically, block 61 may receive over line 60:

an ACC-RAM signal for requesting access to local RAM memory 67;

an ACC-REG signal for requesting access to the region level;

an ACC-FAM signal for requesting access to the family level;

an ACC-GROUP signal for requesting access to the group level;

an ACC-DMA signal for requesting access to the registers of DMA controller 41 at group level; and an ACC-BUF signal for requesting access to a buffer memory block 120 (input/output buffer) described in detail later on.

Block 61 supplies along line 62 a signal F for connecting the private bus and local bus via interface 64, and along line 74 a signal G for connecting the local bus and group bus via interface 72.

Block 61 receives along line 75 a signal H containing the access requests to and from the group level.

Module 20 comprises DMA controller block 41 connected to group bus 34, and general-purpose decoding (DMU) block 79 for decoding the addresses emitted by block 41, and for generating access requests to the various system levels.

Block 79 is also connected to a DMA ARBITER block 81 communicating with group arbiter block 76, and which provides for controlling access to and from block 41.

Via arbiter block 81, block 41 may access address generating block 70 for programming it.

More specifically, block 81 receives a number of signals from block 79:

a PGM-ADG-LOC signal for requesting access by DMA controller 41 to block 70, for programming block 70;

a PGM-ADG-BUF signal for requesting access to a block 130 addressing block 120, for programming block 130;

an ACC-GROUP signal for requesting access to the group level;

an ACC-FAM signal for requesting access to the family level; and an ACC-REG signal for requesting access to the region level.

Data exchange module 20 also comprises a line (bus) 100 extending from group bus 34 to private bus 49 to which it is connected via a separating device 101.

Line 100 also presents two separating devices 103, 104, so that it is subdivided into a first portion 100' extending between separating devices 101, 103; a second portion 100" extending between separating devices 103, 104; and a third portion 100''' extending between device 104 and group bus 34.

Module 20 comprises an add-on arbiter block 110 input-connected to decoding (DMU) block 59 and to group arbiter block 76.

Block 110 is output-connected to separating devices 101, 103, 104 over respective lines 111, 113, 114.

Module 20 comprises buffer memory block 120 communicating with portion 100" of bus 100 and with an input/output channel (e.g. formed by interregional bus 24). Block 120 provides for temporary data storage, and presents a memory size depending on the type of data exchange input/output channel employed.

Block 120 is accessible directly by processor 47 and coprocessor 51 via separating devices 101, 103, and from the architectural standpoint forms part of the private level.

Controller block 41, however, may access block 120 directly via group level and separating device 104, for loading/unloading the data in block 120 into local RAM memory 67 of module 20 or another system 1 module.

Block 120 cooperates with address generating block 130, which also communicates with group bus 34 and provides for locally generating the addresses for block 120 (buffer) when this is accessed in DMA mode.

More specifically, and as explained in more detail later on, block 130 synthesizes the next location address following that of the current cycle, and provides for high speed data transfer on region and family buses 10, 14.

Block 110 provides for arbitrating access requests to block 120 from private-level processor 47 (and generated by DMU block 59), and for arbitrating access requests to block 120 from the input/output channel and generated by an input/output controller block 140 connected to the input/output channel.

Arbiter block 110 generates:

an R signal transmitted over line 111 for enabling separating device 101;

an S signal transmitted over line 113 for enabling separating device 103;

a T signal transmitted over line 114 for enabling separating device 104; and a U signal for enabling a separating device 150 along the input/output channel.

Figure 4:
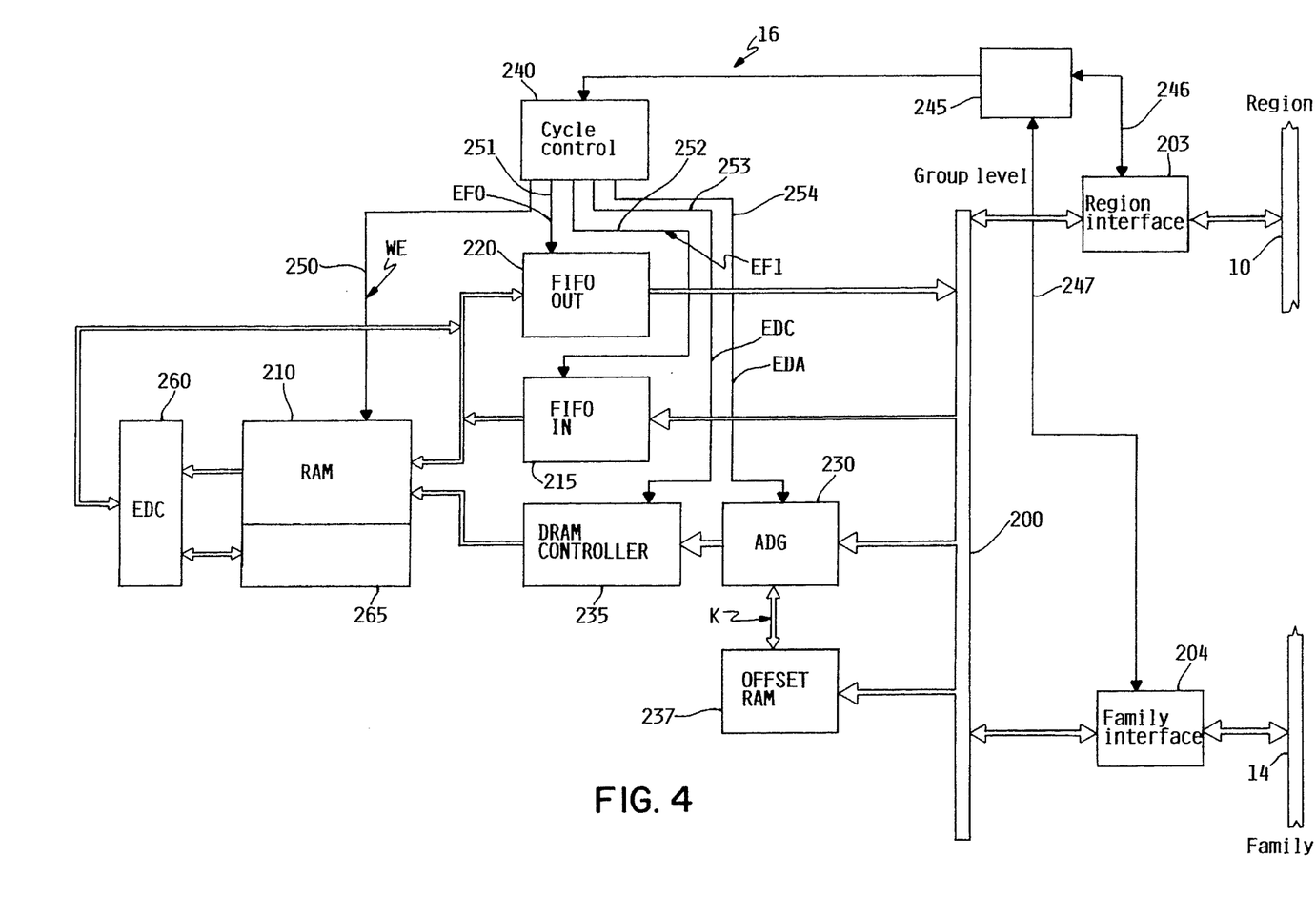
FIG. 4 shows a block diagram of a third module in the FIG. 1 system.

Memory module MEMT 16 will now be described in detail with reference to FIG. 4.

Internally, each memory module MEMT 16 comprises a data exchange line 200, similar to a group bus, connected to region bus 10 and family bus 14 by respective interface blocks 203, 204.

More specifically, interface blocks 203, 204 contain the decoding functions for accessing MEMT module 16 according to the system mapping structure, which functions are programmed via region bus 10 during startup of system 1.

Memory module MEMT comprises a RAM memory (MEMORY ARRAY) 210 input-connected to bus 200 via the interposition of a first block FIFO IN (first in first out) 215, and having an output connected to bus 200 via the interposition of a second block FIFO OUT (first in first out) 220.

Memory 210 is composed of four dynamic RAM banks, each with a four Mega×32 bit capacity.

The first block FIFO IN 215 provides for temporally decoupling a write cycle on region bus 10 or family bus 14 and a write cycle in memory 210.

The second block FIFO OUT 220 provides for temporally decoupling of a read cycle on the region or family bus and a read cycle in memory 210.

MEMT module 16 comprises an address generating block (ADG) 230 communicating with bus 200; and a DRAM CONTROLLER block 235 connected to block 230 and RAM memory 210, and which provides for addressing memory 210 as described later on.

Address generating block 230 is also connected to an OFFSET RAM block 237 communicating with bus 200, and which causes block 230, in the course of DMA cycles (as explained in detail later on), to generate nonconsecutive addresses offset by programmable intervals.

MEMT module 16 also comprises a CYCLE CONTROL block 240 communicating with a group arbiter block 245 connected by respective lines 246, 247 to interface blocks 203, 204.

Cycle control block 240 is connected by respective control lines 250, 251, 252, 253, 254 to memory 210, in which it may perform a read/write cycle, to FIFO OUT block 220, FIFO IN block 215, DRAM controller block 235, and address generating block ADG 230.

Memory 210 is connected to an EDC block 260 for generating an error-detecting (e.g. Hamming) code for the write data. More specifically, EDC block 260 assigns to each 32-bit word stored in memory 210 a seven-bit error-detecting code created on the basis of the Hamming polynomial, and which provides for detecting and correcting one error in the 32-bit word, and for detecting (but not correcting) two (or more) errors.

Memory 210 is also connected to a CHECK MEMORY block 265 containing the bit set from which to generate the codes for detecting and correcting errors in the input and output data of memory 210.

By means of block 260, the data in memories 210 is read and scrubbed periodically (e.g. at 1 Herz frequency) to eliminate, by virtue of the Hamming code assigned to each 32-bit word, any one-bit errors occurring in the words (e.g. due to alpha particles).

In actual use, block 245 of MEMT module 16 arbitrates the access requests from region bus 10 and family bus 14, and then enables cycle control block 240 which provides for performing the read/write cycles in MEMT module 16.

More specifically, cycle control block 240 generates respectively:

a WE signal along line 250 for write-enabling memory 210;

an EFO signal along line 251 for writing the output data from memory 210 in FIFO OUT block 220;

an EFI signal along line 252 for enabling reading of the data in FIFO IN block 215 and transmitting it to memory 210;

an EDC signal for enabling DRAM controller block 235 to emit a new address to block 210; and an EDA signal for enabling address generating block 230 in DMA mode.

Figure 6:
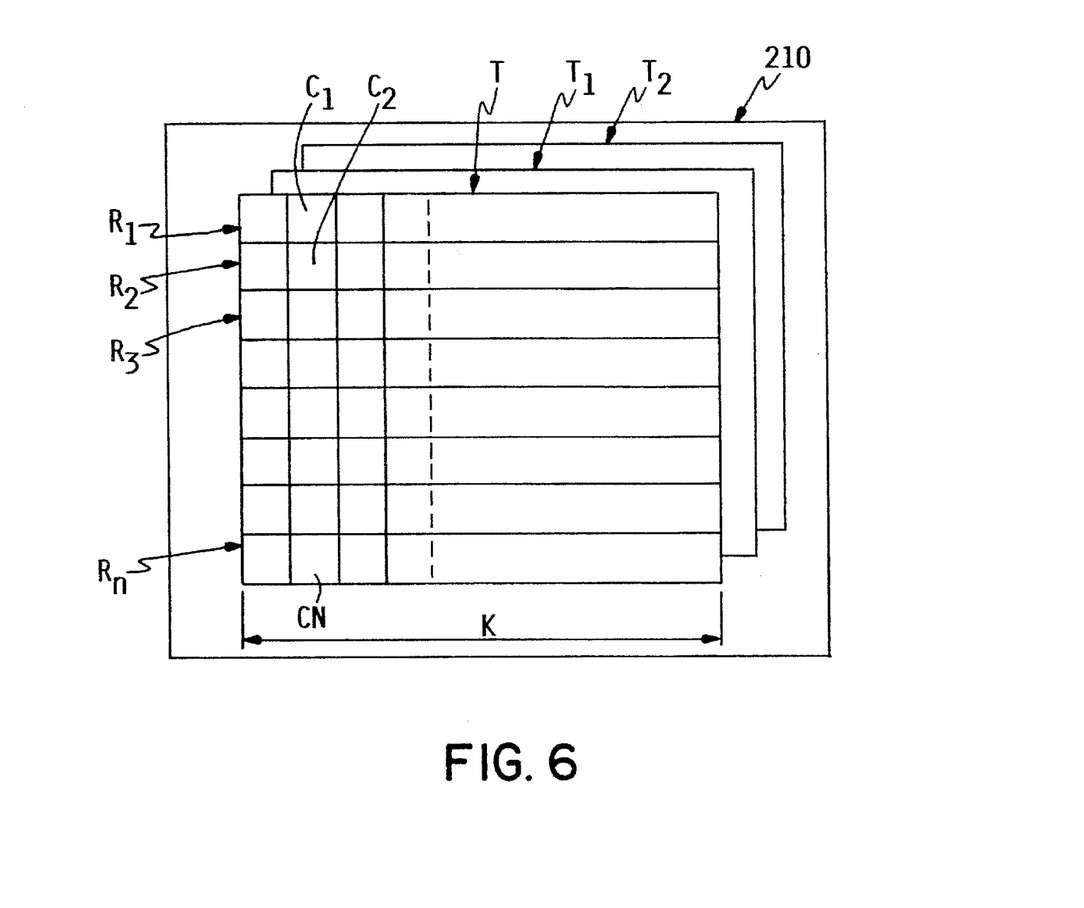
FIG. 6 shows the internal structure of a FIG. 4 module memory.

FIG. 6 shows a schematic diagram of the internal structure of memory 210, which does not necessarily correspond with the actual physical embodiment of memory 210, but serves to illustrate the particular mechanism by which memory 210 is addressed by blocks 230, 237 according to the present invention.

More specifically, memory 210 may be thought of as defining a rectangular table T divided into N number of rows R1, R2, R3 . . . Rn, each composed of K elementary storage modules in turn composed of a given number of bits, e.g. 32.

Table T therefore contains N*K elementary modules, and is normally read/written in successive rows by sequentially accessing the various elementary modules in each row by means of successive addresses.

According to the present invention, in DMA cycles, the memory may also be accessed in columns.

Column access is achieved by adding to the address of the first addressed memory module C1 (constituting the first element in the column) an integer K (transposition offset generated by block 237), to permit nonconsecutive memory locations separated by a constant distance K to be accessed by addressing a second element C2 in the same column as element C1.

The above operations are repeated sequentially until the last element CN in the column is addressed.

In read mode by columns, block 230 generates the address using an accumulating adder, one addend of which is programmable and consists of integer K (transposition offset) from OFFSET RAM block 237.

By providing memory 210 with a number of tables T, T1 ... Tn of different sizes K (e.g. K, K1 ... Kn), each PE module in the system may be assigned a respective table and, hence, a respective K value for reading the table in columns.

OFFSET RAM block 237 is composed of a static RAM memory bank with a 2 K×24 bit capacity, which RAM is addressed at the input with a parameter exclusively indicating the PE module 31 performing the data read/write cycle, and supplies at the output the transposition offset K for that particular PE module 31.

DRAM controller block 235 provides for multiplexing the addresses from block 230.

The multiprocessor system according to the present invention therefore employs six hierarchical levels "nested" from the elementary processing unit (processor 47 or coprocessor 51) to the system consisting of the processing unit 3 network.

The six levels, classed according to the extent to which they are permitted to share the common resources of the system (memories and inputs/outputs accessible directly by all the elements connected to the same bus), include: private level, local level, group level, family level, region level, and region network level.

Taken individually, the following observations may be made:

1) The private level represents the innermost level of system 1, and typically consists of an independent processor 47 (or coprocessor 51) and a memory 53 dedicated exclusively to the processor.

2) The local level permits processor 47 (or coprocessor 51) to access local memory 67 via ADG block 70.

3) The group level permits communication between PE modules 31 and, hence, between different processors 47 forming part of the same PN 5 module.

4) The family level consists of a set of multiprocessing modules 5 and data exchange and storage modules sharing a common memory space and communicating via family bus 14. Each module 5 may access local memory 67 of other system modules, as well as actual common resources such as MEMT module 16 and data exchange module 20.

5) The region level consists of a set of families sharing a common memory space.

6) The interregional level permits processing units 3 to communicate with one another.

As such, system 1 is based on six levels, the first five of which (private-local-group-family-region) are "mapped" in the addressing space (4 Gbytes) of each processor 47.

Each level may contain a variable amount of storage, so that, after supplying system 1, a system startup phase must be performed to establish the size of the memory assigned to each level.

No startup phase is performed for the private level which presents a constant predetermined size (32 Mbytes) to permit each processor 47 to access all the private resources (RAM memory 53, memory 55, etc.) required for it to operate.

Figure 7:
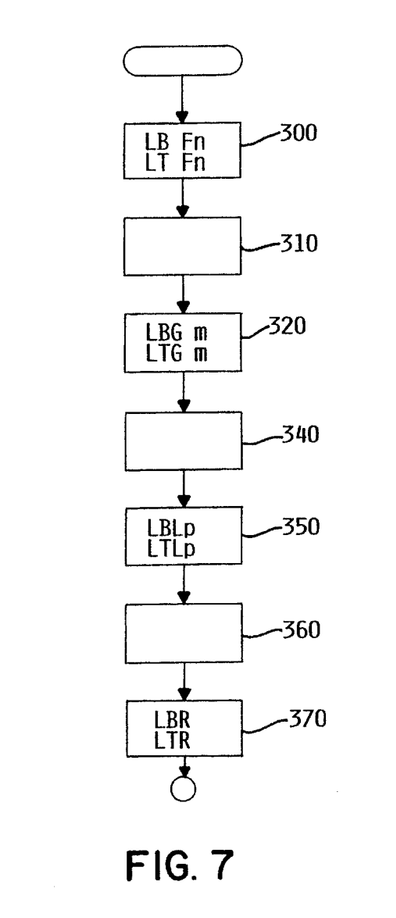
FIG. 7 shows a logic block diagram of the startup phase of the FIG. 1 system.

The startup phase is performed by a "master" elected PE module 31 by means of the operation sequence shown in the FIG. 7 block diagram.

With reference to FIG. 7, the sequence commences with a block 300 which determines the amount of storage present in each family and which is represented, for a given n-th family, by two limit addresses: LBFn (Limit-Bottom-Family-n) and LTFn (Limit-Top-Family-n).

Block 300 goes on to block 310 in which the two limit addresses LBFn, LTFn defined in block 300 are programmed in family decoders (formed in family interface 39 and not shown) of family n, so that each address emitted by a processor 47 (or coprocessor 51) in the n-th family and falling within the two limits LBFn, LTFn requests access to the n-th family bus.

Block 310 goes on to block 320 which, within the two family limits LTFn, LBFn defined in block 300, identifies a number of address spaces, each relative to a group in the n-th family, each contiguous to another space, and each represented, for the m-th group, by two limit addresses: LBGm (Limit-Bottom-Group-m) and LTGm (Limit-Top-Group-m).

Block 320 goes on to block 340 in which the two limit addresses LBGm, LTGm identifying the m-th group are programmed in group decoders (indicated 96 in FIG. 2) of group m itself, so that each address emitted by any processor 47 (or coprocessor 51) in group m and falling within limits LBGm, LTGm requests access to the m-th group bus.

Block 340 goes on to block 350 which, within the two group limits LBGm, LTGm defined by block 320, and for multiprocessor modules PN only, identifies a number of address spaces, each relative to a local bus in group m, each contiguous to another space, and each represented, for the p-th local bus, by two limit addresses: LBLp (Limit-Bottom-Local-p) and LTLp (Limit-Top-Local-p). In monoprocessor modules, the size of the local level obviously corresponds with the group size.

Block 350 goes on to block 360 in which the two limit addresses LBLp, LTLp identifying local bus p are programmed in local decoders (formed by UPC block 58) of the PE module, so that each address emitted by a processor 47 in a p-th PE module and falling within limits LBLp, LTLp requests access to the p-th local bus.

Block 360 goes on to block 370 which defines the region address space, which consists of the combined address spaces of the families and is represented by two limit addresses: LBR (Limit-Bottom-Region) and LTR (Limit-Top-Region).

Figure 8:
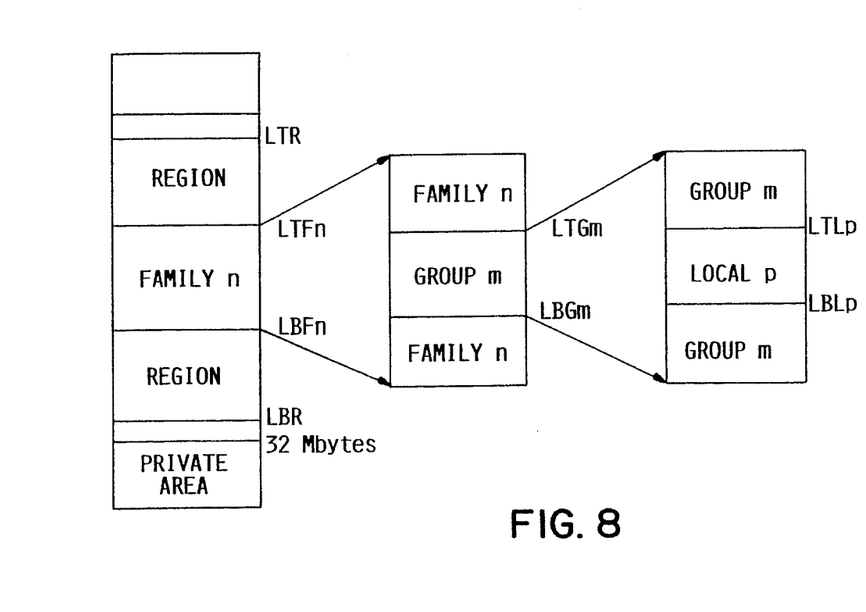
FIG. 8 shows the areas into which the FIG. 1 system memory is subdivided.

The FIG. 8 diagram shows the subdivision of the system memory effected by the above procedure.

With the above mapping layout, each PE module selects the level at which to perform a transaction fully automatically.

The first five hierarchical levels together form the overall processing unit 3 of system 1, which is characterized by "visibility" or direct access to a given physical address space by the various mutually-cooperating PN modules 5. Unit 3 in itself constitutes an extremely high-power system capable of real-time controlling a set of several tens of families, each family in turn consisting of several tens of multiprocessor modules PN. Power in terms of MIPS (million instructions per second) for each region may be thought of as ranging between 100 and 10000 MIPS depending on the type of processor and coprocessor used.

The total processing power of the network system of regions 7 may therefore range between over 10000 MIPS and 16 times 10000, which is far superior to that currently achievable by known systems.

An example will now be described of a data transmission between two PE modules 31 forming part of different processing units 3.

Message transfer between any one PE module and another forming part of another unit 3 is effected using a number of techniques provided for by the operating system in a series of phases:

1) If the message is in a private memory 53, it is obviously the job of processor 47 to transfer it to local memory 67 of PE module 31 via interface 64.
2) The message is then transferred from local memory 67 to group bus 34 via interface 72.
3) The data transaction continues on region bus 10 or family bus 14. Family bus 14 is preferential as compared with region bus 10, and in the event of communication between two PN modules 5 connected by family bus 14 and region bus 10, the transaction is conducted automatically on family bus 14.
4) The message is transferred to data exchange module 20.
5) The message is transferred to interregional bus 24.
6) The message is received by the data exchange module 20 of the destination processing unit.
7) The message is transferred to region bus 10 or family bus 14.
8) The message is transferred to local bus 34 and local memory 67.
9) The message is transferred by processor 47 from local memory 67 to private memory 53.

Data exchange in DMA mode involves a preparatory phase in which to determine the communication channel between the source and destination.

The preparatory phase is performed entirely by the DMA controller 41 of the PN module in which the processor 47 requesting the data exchange is located, for which purpose, DMA controller 41 is programmed by processor 47 with the physical address of the first location of the data block in the source RAM 67, with the physical address of the first location of the data block in the destination RAM 67, and with the size of the data block being transferred.

The preparatory phase continues with DMA controller 41 requesting access to the hierarchical levels required for effecting the data exchange, for which purpose, block 41 employs DMU block 79 containing the system mapping structure. The above operation makes selection of the levels at which to effect the data exchange in DMA mode automatic, i.e. invisible to the system 1 programmer.

At this point, actual data transfer in DMA mode is commenced. The data in the source local RAM 67 is first transferred to a pipeline register PIP (FIG. 2) at the output of RAM 67, so that a subsequent read cycle may be performed in the source RAM 67 even before the current cycle data is fetched from the pipeline register.

From the pipeline register at the source RAM, the data passes along the selected data exchange buses to a second pipeline register at the destination local RAM, and finally to the destination RAM itself. The data block programmed for data transfer is automatically broken up into sub-blocks of four kilobytes to prevent overoccupation of the data exchange buses by DMA controller block 41.

For example, DMA data transfers may be made via group level between two local RAMs 67 of two PE modules in the same PN module, in which case, to prevent conflict between various PE modules, a hardware device (traffic light) 41a of DMA controller 41 provides for assigning the group bus to only one PE module at a time.

In the case of data exchange between PN modules connected by the family and region bus (PN modules forming part of the same unit 3), transfers employ the local source and destination levels, the group level of the module containing the source local RAM, and the family level and group level of the module containing the destination local RAM.

In the case of DMA data exchange between two modules connected by the region bus only (modules in different families), transfers employ the local source and destination levels, the group level of the module containing the source local RAM, and the region level and group level of the module containing the destination local RAM.

DMA controller 41 is of great importance as regards data exchange modules 20 in which, in addition to local RAM 67, it is also permitted access to buffer memory block 120 for filling/emptying it.

The advantages of the present invention as compared with the system described in Patent EP-226.096 will be clear from the foregoing description.

Inside each multiprocessor module PN 5, system 1 presents a communication channel (group bus) common to all the PE modules 31 and which, absent in said Patent EP-226.096, permits activity within the PN module with no interference with the external environment (family and region).

In particular, by means of the group bus, each PE module in the PN module may access the local RAM 67 of another PE module, and exchange data (even in DMA mode) without interacting with the other PE modules or higher family and region levels.

As such, each PE module may access its own local RAM 67 directly without interfering with the other PE modules, and may access the family and region levels while the other PE modules access their own local levels.

System 1 therefore employs coprocessor 51 openly and flexibly since each PE module 31 may employ different (commercial or custom) coprocessors by virtue of UPC block 58 translating the linear addresses emitted by coprocessor 51 into physical addresses so that the memory management of coprocessor 51 corresponds with that of processor 47.

The particular hardware structure employed for supporting coprocessor 51 also enables coprocessors of different sizes and pin arrangements to be used without altering the CSM printed circuit supporting the components forming the host module (e.g. PN module 5).

System 1 also presents a "distributed" DMA structure, i.e. each PN module 5 presents its own device (DMA controller 41) capable of supporting data exchange to and from the other system 1 modules in DMA mode.

Such DMA transfers may be made at various hierarchical levels of the system as demonstrated previously.

What is more, DMA transfer always employs three pipeline stages (source pipeline register—transfer buses—destination pipeline register) thus providing for considerable decoupling of the data source and destination, and greatly reducing the access time of the exchange buses.

The particular structure of MEMT module 16 permits both row and column access to memory 210, which is particularly advantageous when dealing with certain types of data (such as image digitization data).

Compulsory use of the family level for transactions between two PE modules 31 in the same family provides for safeguarding against deadlock situations.

For example, if two PE modules forming part of PN modules sharing the same family bus, and obviously the same region bus, were not compelled to use the family bus for data exchange, one could use the family bus and the other the region bus. This would inevitably result in a deadlock, in that the group bus of the first PE module may be occupied for access to the family bus to the second PE module which would fail to receive the data by virtue of its own group bus possibly being occupied for access to the region bus to the first module.

The startup phase described permits each processor 47 of each PE module to know the mapping structure of unit 3 from its own vantage point.

With the mapping structure, each PE module selects the data exchange level automatically and fully "transparently" to the programmer.

Clearly, changes may be made to the multiprocessor system as described and illustrated herein without, however, departing from the scope of the present invention.

We claim:

1. A multilevel multiprocessor system comprising at least one processing unit (3), each processing unit (3) comprising:
    a plurality of multiprocessor modules PN (5), a region line (10), and a plurality of family lines (14),
    each of the multiprocessor modules PN (5) connected to the region line (10) to form a region level,
    the multiprocessor modules PN (5) being subdivided into subgroups, each multiprocessor module PN (5) in only one of said subgroups, each subgroup forming a family (8) of multiprocessor modules PN (5), each family (8) of microprocessor modules PN (5) having a respective one of said family lines (14) connected to the microprocessor modules PN (5) only in said respective family, each such family line (14) being distinct from the other family lines (14);
    each multiprocessor module PN (5) comprised of a group line (34) and a plurality of active processing modules PE (31) each connected to the group line (34) forming a group level; and
    each group line (34) in each multiprocessor module PN (5) communicating with said region line (10) and one family line (14).

2. A system as claimed in claim 1 further comprising a number of processing units (3) connected to one another by data receiving and transmitting means (24) to form a region network.

3. A system as claimed in claim 2 further comprising at least one data exchange module (20) connected between said family line (14) and said region line (10); said data exchange module (20) being directly accessible to and from said family line (14), said region line (10) and said data receiving and transmitting means (24).

4. A system as claimed in claim 1, characterized in that each multiprocessor module PN (5) preferentially employs said family line (14) for data exchange with another multiprocessor module PN (5) in the same family.

5. A system as claimed in claim 1, characterized in that each said processing module PE (31) comprises at least one processor (47) and private memory means (53) associated with said processor (47), said processor (47) and said private memory means (53) being connected to a private communication line (49) defining a private level;
    said processing module PE (31) also comprising a local communication line (66) separable/connectable from/ to private line (49) and communicating with said group line (34).

6. A system as claimed in claim 5 further comprising a coprocessor (51) associated with each said processor (47) and communicating with said private line (49);
    said coprocessor (51) assisting processing by said processor (47).

7. A system as claimed in claim 6, characterized in that each active processing module PE (31) comprises UPC (coprocessor paging unit) means (58) connected to said private line (49) and cooperating with said coprocessor (51);
    said UPC means (58) translating linear addresses emitted by said coprocessor (51) into physical addresses.

8. A system as claimed in claim 6, wherein each multiprocessor module PN (5) is formed on a main board (CSM) supporting a number of electronic components; characterized in that said main board (CSM) presents at least one socket (Z) for connecting to an integrated circuit forming said processor (47);
    said integrated circuit forming said processor (47) and an integrated circuit forming said coprocessor (51) being supported on an additional (ADD-ON) board separate from said main board (CSM).

9. A system as claimed in claim 6 further comprising, a memory module MEMT startup means (31) for performing a system startup phase for determining a memory size of a system memory assignable to said region level, family level, group level and local level.

10. A system as claimed in claim 5, characterized in that each said processing module PE (31) comprises first RAM type private memory means (53) communicating with said private line (49); and
    second EPROM type memory means (55) communicating with said private line (49) and supporting an operating system and/or startup and diagnostic programs.

11. A system as claimed in claim 5, characterized in that each said processing module PE (31) comprises first decoding means DMU (59) for receiving a connection request emitted by said processor (47) and/or a coprocessor (51) for access to said private line (40), to said local line (66) and to said group line (34),
    said first decoding means (59) cooperating with local arbitrating means (61) for controlling connection between said private line (49), said local line (66) and said group line (34) according to a request from said first decoding means (59).

12. A system as claimed in claim 1 further comprising at least one memory module MEMT (16) connected between said family line (14) and said region line (10); said memory module MEMT (16) being directly accessible to and from said family line (14) and said region line (10).

13. A system as claimed in claim 12, wherein the memory module MEMT (16) further comprises a RAM memory (210) connected to an EDC block (260) for generating an error-detecting code, in particular a Hamming code, for detecting/correcting at least one data error.

14. A system as claimed in claim 12, wherein the memory module MEMT (16) further comprises a CHECK MEMORY block (265) connected to said RAM memory (210) for generating error-detecting codes for detecting and correcting errors in the input and output data of the memory (210).

15. A multi level multiprocessor system comprising:
    at least one processing unit (3) comprising a number of multiprocessor modules PN (5), each multiprocessor module PN (5) connected to a single region line (10) to form a region level;
    a plurality of separate family lines, said number of multiprocessor modules PN (5) also being subdivided into at least two subgroups, each subgroups comprising respective members of separate multiprocessor modules PN (5), all multiprocessor modules PN (5) in each subgroup connected to one family line to form a family level wherein each subgroup of multiprocessor modules PN (5) having respective family line;

a group line in each multiprocessor module having a number of active processing modules PE (31) connected to the group line (34) to form a group level each processing module PE (31) further comprising:

at least one processor (47) and private memory means (53) associated with said processor, said processor (47) in said private memory means (53) being connected to a private communication line (49) defining a private level:

said processing module PE (31) also comprising a local communication line (66) separable/connectable from/to private line (49) and communicating with said group line 34;

a first decoding means DMU (59) for receiving a connection request emitted by said processor (47) and/or coprocessor (51) for access to said private line (40), to said local line (66) and to said group line (34), said first decoding means (59) cooperating with local arbitrating means (61) for controlling connection between said private line (49), said local line (66) and said group line (34) according to a request from said first decoding means (59);

said group line (34) in each multiprocessor module also communicating with said region line (10) and the respective family line (14);

first interface means (64) interposed between said private line (49) and said local line (66); second interface means (72) interposed between said local line (66) and said group line (34); said local arbitrating means (61), on the basis of the request generated by said first decoding means DMU (59), supplying said first (64) and second (72) interface means with respective signals (F, G) for connecting said private line (49) and said local line (66) via first interface means (64), and connecting said local line (66) and said group line (34) via said second interface means (72).

16. A system as claimed in claim 15 further comprising:

third interface means (37) interposed between said group line (34) and said region line (10); and fourth interface means (39) interposed between said group line (34) and said family line (14);

said processing module PE (31) also comprising group arbitrating means (76) cooperating with said local arbitrating means (61) and controlling said third (37) and fourth (39) interface means.

17. A system as claimed in claim 16, characterized in that each said processing module PE (31) comprises RAM local memory means (67) connected to said local line (66) and accessible by said processor (47).

18. A system as claimed in claim 17 further comprising an addressing means ADG (70) connected to said local line (66) and cooperating with said local memory means (67), for generating physical addresses for said local memory (67).

19. A system as claimed in claim 17, characterized in that said local arbitrating means (61) receive from said first decoding means (59):

an ACC-RAM signal for requesting access to said local memory;

an ACC-REG signal for requesting access to the region level;

an ACC-FAM signal for requesting access to the family level;

an ACC-GROUP signal for requesting access to the group level; and an ACC-DMA signal for requesting access to a register of said DMA controller means (41).

20. A system as claimed in claim 18, characterized in that each said multiprocessor module PN (5) presents direct memory access DMA controller means (41) communicating with said group line (34);

said DMA controller means (41) selecting addresses of memory locations to transfer or receive a data block.

21. A system as claimed in claim 20 further comprising a second decoding means DMU (79) cooperating with said DMA controller means (41), and which decodes signals emitted by said controller means (41), for generating the access requests to the various hierarchical levels of the system:

said second decoding means (79) containing information relative to a mapping structure of the memory locations.

22. A system as claimed in claim 21, characterized in that said second decoding means (79) cooperate with a DMA arbitrating means (81) communicating with said group arbitrating means (76), for controlling access to and from said addressing means ADG (70) for programming said addressing means (70).

23. A multilevel multiprocessor system comprising:

at least one processing unit (3) comprising a number of multiprocessor modules PN (5) connected to a region line (10) to form a region level, each said multiprocessor module PN (5) having direct memory access DMA controller means (41);

a plurality of separate family lines, said number of multiprocessor modules PN (5) also being subdivided into at least two subgroups, each subgroup comprising respective numbers of multiprocessor modules PN (5) and directly connected to one family line (14) to form a family level;

each multiprocessor module (5) comprising a group line and a number of active processing modules PE (31) connected to a group line (34) to form the group level, said group line (34) also communicating with said direct memory access DMA controller means (41) and said region line (10) and one family line (14);

each said processing module PE (31) comprising at least one processor (47) having a private memory means (53), a private line (49) connected to said processor (47) and private memory means (53) forming a private level, a local line (66) separable/connectable from/to the private line (49) and communicating with said group line (34), a RAM local memory means (67) connected to said local line (66) and accessible by said processor (47), a first decoding means DMU (59) for receiving a connection request from said processor (47) and/or said coprocessor (51) for access to said group line (34), a local arbitrating means (61) for controlling connection between said private line (49), said local line (66) and said group line (34) according to a request from said first decoding means (59), a group arbitrating means (76) cooperating with said local arbitrating means;

first interface means (64) interposed between said private line (49) and said local line (66) connected to local arbitrating means (61);

second interface means (72) interposed between said local line (66) and said group line (34) connected to local arbitrating means (61);

third interface means (37) interposed between said group line (34) and said region line (10) and attached to group arbitrating means (76);

fourth interface means (39) interposed between said group line (34) and said family line (14);

an addressing means ADG (70) connected to said local line (66) and cooperating with said local memory means (67), for generating physical addresses for said local memory (67);

a second decoding means DMU (79) cooperating with said DMA controller means (41), and which decodes signals emitted by said controller means (41), for generating the access requests to the various levels of the system, a memory mapping structure in said second decoding means (79), and a DMA arbitrating means (81) communicating with said group arbitrating means (76), for controlling access to and from said addressing means ADG (70) for programming said addressing means (70);

a PGM-ADG-LOC signal from said second decoding means (79) to said DMA arbitrating means (81) for requesting access to the region level.

24. A system as claimed in claim 23, characterized in that said memory module MEMT (16) comprises:

a data exchange line (200) communicating with the region line (10) and the family line (14) via respective region and family interfaces (203, 204);

a RAM memory (210) addressable in rows and columns;

first temporary data accumulating means FIFO IN (215) interposed between said data exchange line (200) and a data input of said RAM memory (210); and second temporary data accumulating means FIFO OUT (220) interposed between said data exchange line (200) and a data output of said RAM memory (210).

25. A multilevel multiprocessor system comprising:

at least one processing unit (3) comprising a number of multiprocessor modules PN (5) connected to a region line (10) to form a region level;

a plurality of separate family lines, said number of multiprocessor modules PN (5) also being subdivided into at least two subgroups, each subgroup comprising respective numbers of multiprocessor modules PN (5) directly connected to one family line (14) to form a family level;

each multiprocessor module (5) comprising a number of active processing modules PE (31) and a group line interconnecting the active processing modules PE to form a group level;

said group line (34) also communicating with said region line (10) and one family line (14);

a memory module MEMT (16) connected between said family line (14) and said region line (10), said memory module MEMT (16) being directly accessible to and from said family line (14) and said region line (10), said memory module MEMT (16) having address generating means (230) connected to OFFSET RAM means (237), memory controlling means (235) interposed between said address generating means (230) and a RAM memory (210);

said memory (210) defining a data accumulating structure comprising at least one rectangular table (T) divisible into N number of rows R1, R2, R3 . . . Rn, each composed of K elementary storage modules; and said address generating means (230) obtaining access to said table (T) in columns by sequentially adding to the address of a first addressed storage module (C1) an integer K (transposition offset) generated by said OFFSET RAM means (237) and equal to the number K of elementary modules per row.

26. A system as claimed in claim 25, characterized in that said memory module (16) defines a data accumulation structure composed of a number of tables (T, T1 , , , Tn) with rows of different lengths;

each said table (T, T1 . . . Tn) being associated with a respective processing module PE (31);

said address generating means (230) obtaining access by columns to said tables (T, T1 . . . Tn) using different integers (K, K1 . . . Kn) (transposition offsets) generated by said OFFSET RAM means (237).

27. A system as claimed in claim 26, characterized in that said memory module MEMT (16) comprises:

cycle control means (240) for controlling said RAM memory (210), a first temporary data accumulating means (215) and a second temporary data accumulating means (220); and group arbitrating means (245) communicating with said cycle control means (240) and said region and family interfaces (203, 204);

said group arbitrating means (245) arbitrating access requests from the region line (10) and family line (14); and, at the end of the arbitration phase, enabling said cycle control means (240) to perform the read/write cycles in said MEMT module (16).

28. A system as claimed in claim 27, characterized in that said cycle control means (240) generate respectively:

a WE signal for write-enabling the memory (210);

an EFO signal for writing an output data from the memory (210) in said second temporary accumulating means FIFO OUT (220);

an EFI signal for enabling reading of the data in said first temporary accumulating means FIFO IN (215) and supply of said data to the memory (210);

an EDC signal for enabling said address generating means (230); and an EDA signal for enabling said memory controlling means (235).

29. A multilevel multiprocessor system comprising:

at least one processing unit (3) comprising a number of multiprocessor modules PN (5) connected to a region line (10) to form a region level, each said multiprocessor module PN (5) having a direct memory access DMA controller means (41);

a plurality of separate family lines said number of multiprocessor modules PN (5) also being subdivided into at least two subgroups, each comprising respective numbers of multiprocessor modules PN (5) directly connected to a family line (14) to form a family level;

each multiprocessor module PN (5) comprising a group line and a number of active processing modules PE (31) connected to a group line (34) to form a group level, said group line (34) also communicating with said region line (10) and one family line (14);

a number of processing units (3) connected to one another by data receiving and transmitting means (24) to form a region network;

a data exchange module (20) connected between said family line (14) and said region line (10), said data exchange module (20) being directly accessible to and from said family line (14), said region line (10) and said data receiving and transmitting means (24);

a processor (47) communicating with a common communication line (49) defining a private level, a second common communication line (66) communicating with said private line (49) via first interface means (64) and defining a local level;

local memory means (67) communicating with said local line (66), said group communication line (34) communicating with said local line (66) via second interface means (72), said group line (34) communicating with said family line (14) and said region line (10);

a fourth common communication line (100) for data exchange, communicating with said private line (49) and with said group line (34) via respective third and fourth interface means (101, 104);

buffer memory means (120) communicating with said data exchange line (100) and said data receiving and transmitting means (24); and said buffer memory means (120) temporarily storing data exchanged to and from said data exchange module (20).

30. A system as claimed in claim 29, characterized in that said data exchange module (20) comprises:

addressing means (130) communicating with said group line (34) and said buffer memory means (120);

said addressing means (130) generating addresses for said buffer memory means (120).

31. A system as claimed in claim 30, characterized in that said data exchange module (20) comprises:

I/O arbitrating means (110) communicating at the input with third decoding means (59) connected to said private line (49);

said I/O arbitrating means (110) communicating at least with said third and fourth interfaces (101, 104) and with a fifth interface (150) cooperating with said data transmitting means (24);

said I/O arbitrating means (110) arbitrating access requests to said data exchange module (20) from said private level, from said group level and from said data transmitting means (24).

32. A system as claimed in claim 29, characterized in that each said data exchange module (20) comprises:

direct memory access DMA controller means (41) communicating with said group line (34);

fourth decoding means DMU cooperating with said DMA controller means (41) and which decode the addresses emitted by said DMA controller means (41), for generating access requests to the various system levels;

said fourth decoding means DMU (79) processing a number of signals including at least:

a PGM-ADG-LOC signal for requesting access by said DMA controller means (41) to an address generating block (70) connected to said local memory (67), for programming said local memory (67) and selecting the memory location as of which to transfer/receive a data block;

an ACC-GROUP signal for requesting access to said group level (49);

a PGM-ADG-BUF signal for requesting access to an addressing means (130) addressing said buffer memory means (120);

an ACC-FAM signal for requesting access to the family level; and an ACC-REG signal for requesting access to the region level.

33. A multilevel multiprocessor system comprising:

at least one processing unit (3) comprising a number of multiprocessor modules PN (5) connected to a region line (10) to form a region level, each said multiprocessor module PN (5) having direct memory access DMA controller means (41);

a plurality of separate family lines, said number of multiprocessor modules PN (5) also being subdivided into at least two subgroups, each comprising respective numbers of multiprocessor modules PN (5) directly connected to one of said family lines (14) to form a family level;

each multiprocessor module (5) comprising a group line and a number of active processing modules PE (31) connected to the group line (34) to form a group level, said group line (34) also communicating with said region line (10) and one family line (14);

said group line (34) also communicating with said region line (10) and said family line 14;

each said processing modules PE (31) comprises at least one processor (47) having private memory means (53) associated with said processor (47), said processor (47) and said private memory means (53) being connected to a private communication line (49) defining a private level, a local communication line (66) separable/connectable from/to private line (49) and communicating with said group line (34);

a coprocessor (51) associated with each said processor (47) and communicating with said private line (49);

said coprocessor (51) assisting processing by said processor (47); and a memory module MEMT startup means (31) for performing a system stamp phase for determining a memory size of a system memory assignable to said region level, family level, group level and local level, said startup means comprising:

first means (300) for determining the amount of storage in each family; which amount of storage is represented, for any given n-th family, by two limit addresses LBFn (Limit-Bottom-Family-n) and LTFn (Limit-Top-Family-n);

second means (310) wherein the two limit addresses LBGn, LTFn defined by said first means (300) are programmed in decoders (39) of family n, so that any address emitted by a processor (47) (or coprocessor 51) in the n-th family and falling within said two limits LBFn, LTFn requests access to a n-th family bus;

third means (320) which, within the two family limits LTFn, LBFn defined by said first means (300), identify a number of address spaces, each relative to a group in the n-th family, each contiguous to another space, and each represented for a m-th group by two limit addresses LBGm (Limit-Bottom-Group-m) and LTGm (Limit-Top-Group-m);

fourth means (340) wherein the two limit addresses LBGm, LTGm identifying the m-th group are programmed in decoders (96) of group m, so that any address emitted by any processor (47) or coprocessor (51) in group m and falling within limits LBGm, LTGm requests access to the m-th group bus;

fifth means (350) which, within the two group limits LBGm, LTGm defined by said third means (320), identify, for the multiprocessor modules PN (5) only, a number of address spaces, each relative to a local bus in group m, each contiguous to another space, and each represented, for a p-th local bus, by two limit addresses LBLp (Limit-Bottom-local-p) and LTLp (Limit-Top-Local-p);

sixth means (360) wherein the two limit addresses LBLp, LTLp identifying the local bus p are programmed in decoders (58) of module PE, so that each address emitted by a processor (47) in the p-th module PE and falling within limits LBLp, LTLp requests access to the p-th local bus;

seventh means (370) for defining the overall address space of a region, which space consists of the combined address spaces of the families, and is defined by two limit addresses LBR (Limit-Bottom-Region) and LTR (Limit-Top-Region).

* * * * *

UNITED STATES PATENT AND TRADEMARK OFFICE
CERTIFICATE OF CORRECTION

PATENT NO. : 5,586,258
DATED : December 17, 1996
INVENTOR(S) : Conterno, et al.

It is certified that error appears in the above-indentified patent and that said Letters Patent is hereby corrected as shown below:

Column 15, line 32, after (34); please add --and--.

Column 20, line 37, delete "stamp" and insert --startup--.

Signed and Sealed this

Second Day of December, 1997

Attest:

BRUCE LEHMAN

Attesting Officer

Commissioner of Patents and Trademarks